Aug. 2, 1932.  F. H. EVANS  1,870,106
WHEEL ALIGNER FOR VEHICLES
Filed July 11, 1928
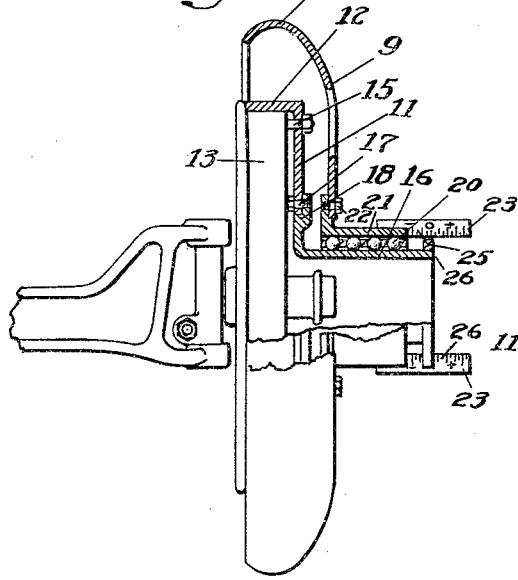
Fig.1.
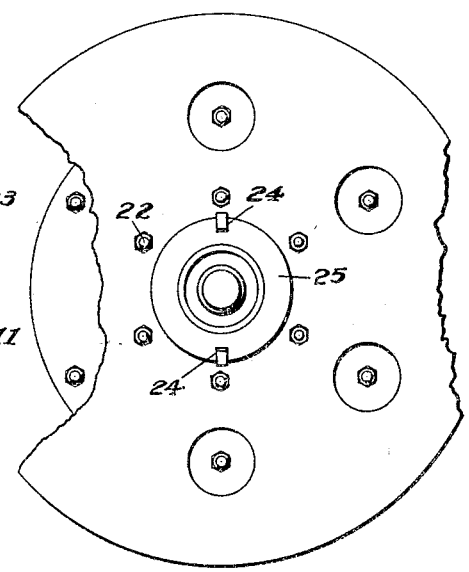
Fig.2.
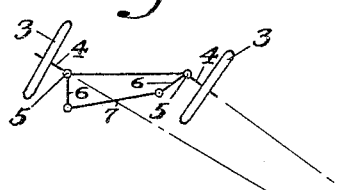
Fig.3.
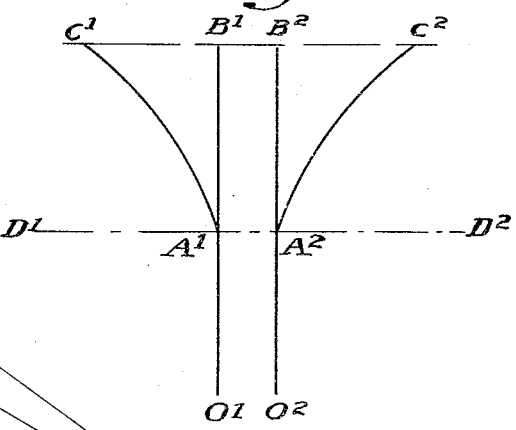
Fig.4.
INVENTOR
Frederick H. Evans
BY
ATTORNEY Patented Aug. 2, 1932

1,870,106

UNITED STATES PATENT OFFICE

FREDERICK H. EVANS, OF ROCHESTER, NEW YORK

WHEEL ALIGNER FOR VEHICLES

Application filed July 11, 1928. Serial No. 291,985.

The present invention relates to wheel aligners for vehicles and an object of the invention is to provide a construction which will not only indicate the misalignment due to the improper length of the connecting rod but will also indicate misalignment due to the improper angles between the steering arms and their spindles. Another object of the invention is to provide a wheel aligning device employing a rolling member having a rolling periphery substantially equal to the rolling periphery of the wheel to be tested and movable in the direction of the axis of the wheel to be tested to indicate the misalignment.

To these and other ends, the invention consists of certain parts and combinations of parts, all of which will be hereinafter described: the novel features being pointed out in the appended claims.

In the drawing:

Fig. 1 is a view partially in elevation and partially in vertical section illustrating one embodiment of this invention;

Fig. 2 is a face view of the same embodiment with parts broken away;

Fig. 3 is a diagrammatic view showing the desired rolling action of the wheels; and Fig. 4 is a diagram which may be used in connection with this invention to make tests.

Wheel aligners heretofore devised have taken into consideration the alignment of the wheels only for straight-ahead driving and have made corrections for this in the lengthening or shortening of the connecting rod. In many instances, the steering arms become bent so that their angles with reference to the spindles are changed. The adjustment of the connecting rod will maintain the wheels in alignment so long as the driving is straight-ahead, but in turning corners or in irregular driving, the true and desirable rolling action of the wheels of the vehicle is lost, there is a greater tendency to skid, steering is more difficult and, as these form a large part of driving, the wear on the tires is not eliminated, and there is unnecessary strain on the parts having to do with the steering. In Fig. 3, I have shown a diagram of what is considered the best rolling action of a four wheel vehicle in which the two rear wheels 1 turn about a common axis 2 at all times, while the forward wheels 3 have their spindles 4 pivoted upon two different vertical axes 5, steering arms 6 being connected to the spindles so that they may be moved through the common connecting rod 7. The angles between the arms 6 and the spindles 4 are such that, when the connecting rod is moved to turn corners, the horizontal axes of the two spindles 4 will converge as near as is practicable to a common point 8 which lies on the axis of rotation of the two rear wheels 1. If this rolling action is not maintained then there is increased wear upon the tires and strain on the steering mechanism in turning corners.

In the illustrated embodiment of the invention, there is employed a rolling member 9 which has a periphery 10 formed similar to the tire of a vehicle, this periphery being substantially equal to the periphery of the wheel whose misalignment is to be tested. It is desirable that for the general testing of wheels, there should be a plurality of these members corresponding in diameter to the standard diameters of vehicle tires. This rolling member is supported by a spindle 4 so that it may turn about such spindle as an axis and may also move axially of the spindle during its rolling movement.

One means of supporting the rolling member for its combined rolling and axial movement is herein illustrated comprising a wheel engaging member 11 which has a flange or annular rim 12 adapted to be fitted about the main rim 13 of a vehicle wheel after the tire and the demountable rim have been removed. This wheel engaging member has a plurality of openings arranged in annular series for the reception of the bolts 15 employed for holding the demountable rim of the pneumatic tire in place. The size of this wheel engaging member may vary with the diameter of the wheel 13 and in order that a single bearing 16 may be employed with a number of these wheel engaging members, the wheel engaging member is detachably secured by bolts 17 to an annular flange 18 on the bearing member 16. The bearing member 16 is of tubular formation and is axially aligned with the spindle 4 or with the axis of turning of the wheel 13.

The bearing 16 forms the support for the rolling member 9 and to this end is surrounded by a series of ball bearings 20 which are engaged by a bearing member 21 preferably detachably secured by bolts 22 to the rolling member 9 in order that rolling members of other diameters may be employed.

The bearing member 21 turns with the bearing member 16 but is movable axially of said bearing member 16 in order that the rolling member 9 may not only turn with the wheel 13 but may move relatively thereto in the direction of the axis of turning of said wheel 13. To hold the two members 16 and 20 so that they will turn together while permitting the axial movement of the member 21 guiding means is employed between these two members comprising, in this instance, two guide bars 23 projected from the bearing member 21 and cooperating with guides 24 formed in a flange 25 arranged at the outer end of the bearing 16 and also serving as a stop for the bearing member 20.

With the purpose in view of indicating the amount of axial movement of the rolling member with reference to the wheel, an indicator is provided comprising, in this instance, a scale 26 formed on a guide bar 23, and having graduations leading in opposite directions from a zero mark, one face of the flange 25 serving as an indicator and operating over the scale. On one side of the scale the numbers are minus and on the other side of the scale the numbers are plus but otherwise are the same, progressively increasing in opposite directions from the zero mark.

In using the invention, a tire with its demountable rim is removed from the rim of one of the front wheels. A rolling member 9 having the diameter of the removed tire is secured to a bearing member 21 and a rim engaging member 11 having a diameter to fit the rim of the wheel 13 is secured to the bearing member 16. Thereafter, the device as a whole is attached to a rim so that the parts occupy the positions shown in Fig. 1. On the floor or paving on which the test is to be made a diagram such as shown in Fig. 4 is painted or marked. In this diagram, $A^1$ $B^1$ and $A^2$ $B^2$ are parallel straight lines, their distance apart being equal to the distance from center to center of the tires on the two wheels to be tested. $A^1$ $C^1$ is an arc of the circle which is the path of the left front wheel when it is turned to nearly its extreme position to the left in steering. $A^2$ $C^2$ is an arc of a circle at the same radius as arc $A^1$ $C^1$ and with its center on the line $D^1$ $D^2$, which is perpendicular to $B^1$ $A^1$ and $B^2$ $A^2$. In testing the alignment of the steering mechanism, the car is driven along the lines $O^1$ $B^1$, $O^2$ $B^2$ until the left front wheel rests at $A^1$, and the right front wheel rests at $A^2$. The scale is then set to zero position. The car is rolled forward, the left wheel being steered along the path $A^1$ $B^1$. When the left wheel reaches $B^1$, the reading on the scale is noted. If the reading is on the plus side of the scale, the wheels toe out, and if the reading is on the minus side, the wheels toe in. The length of the connecting rod is adjusted accordingly and the operation is repeated. This is continued until the readings at $A^1$ and at $B^1$ are both zero, indicating that the wheels neither toe in or out when the car is being steered straight forward.

The scale is again set to zero position and the car is rolled forward while the right hand wheel is steered along the line $A^2$ $C^2$. Note is made of the reading on the scale when the right wheel reaches $C^2$. The front wheels are then set at $A^1$ and $B^1$, with the scale at zero, and the car rolled forward with the left wheel following the path $A^1$ $C^1$ until $C^1$ is reached. The reading of the scale at $C^1$ is then noted. If the scale reading at $C^2$ has a greater positive value than the reading at $C^1$, the angle between the spindle and the arm is greater on the right side than it is on the left. If it has a less positive value, the reverse is true. If the algebraic sum of the two readings is greater than zero, the greater angle needs to be made less, but if the sum is less than zero, the lesser angle needs to be made greater. After a correction has been made, the operations are repeated until the indicator has the least possible obtainable movements along the scale under any steering conditions.

What I claim as my invention and desire to secure by Letters Patent is:

1. A wheel aligner comprising a rolling member having a rolling periphery substantially equal to the rolling periphery of the tire normally carried by the wheel to be tested, means for attaching said rolling member to a vehicle so that its rolling periphery may lie substantially in the position of the periphery of the tire normally carried by the wheel to be tested, and said attaching means including means whereby the rolling member may move with respect to said attaching means axially of the wheel to be tested.

2. A wheel aligner comprising a wheel engaging member adapted for attachment to a wheel to be tested, a rolling member mounted on said wheel engaging member and having a periphery substantially equal to that of the tire normally carried by the wheel to be tested, and means supporting said rolling member on said wheel-engaging member to turn with the wheel engaging member and to move thereon coaxially of the wheel.

3. A wheel aligner comprising a rolling member having a periphery substantially equal to that of the tire normally carried by the wheel to be tested, means for attaching the rolling member to the wheel so that the axis of rolling of the rolling member is coaxial with that of the wheel, and said attaching means including means providing for movement of the rolling member axially of and relatively to the wheel.

4. A wheel aligner comprising a wheel engaging rim, a rolling member having a periphery substantially equal to the periphery of the normal tire carried by the wheel to be tested, and means connecting the rolling member with the wheel engaging rim to cause the rolling member to turn with the rim but to permit the rolling member to move axially of the wheel.

5. A wheel aligner comprising a wheel engaging rim, a rolling member having a periphery substantially equal to the periphery of the normal tire carried by the wheel to be tested, and means connecting the rolling member with the wheel engaging rim to cause the rolling member to turn with the rim but to permit the rolling member to move axially of the wheel, said means being detachably connected to the wheel engaging rim and also detachably connected to the rolling member.

6. A wheel aligner comprising two cooperating bearing members, wheel engaging means for supporting one of said bearing members from a wheel to be tested and coaxial with the latter, a rolling member connected to the other of said members, and means causing the two bearing members to turn together while permitting the movement of that bearing member, to which the rolling member is connected, axially of said wheel.

7. A wheel aligner comprising a rolling member having a rolling periphery, means for securing said rolling member to the vehicle so that it may turn about the axis of turning of the wheel to be tested, and said means including means for supporting said rolling member for axial movement relative to said wheel when said member is rolling and the wheel to be tested is misaligned.

8. A wheel aligner comprising a wheel-engaging rim, a rolling member having a periphery substantially equal to the periphery of the tire normally carried by the wheel to be tested, means connecting the rolling member with the wheel-engaging rim to cause the rolling member to turn with the rim but permit the rolling member to move axially of the wheel, and means for measuring the amount of axial movement of said rolling member with respect to the wheel.

FREDERICK H. EVANS.